March 31, 1953  H. J. MOFFETT ET AL  2,633,284
SEALED COOKING CONTAINER FOR COMESTIBLES
Filed March 28, 1949
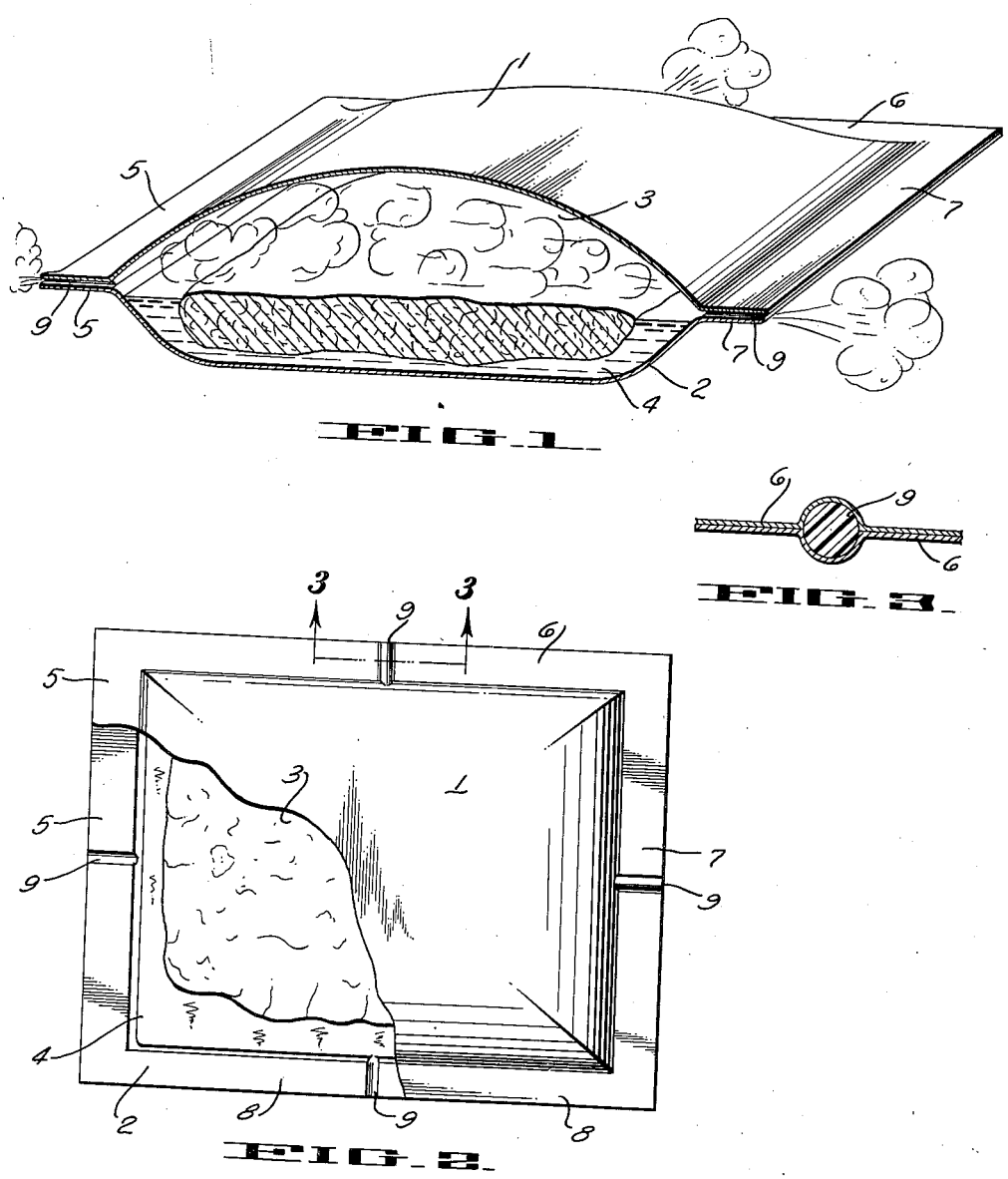
INVENTORS
HOWARD J. MOFFETT
JOHN C. McFARLAND
BY Joseph B. Sundner
atty.

Patented Mar. 31, 1953

2,633,284

UNITED STATES PATENT OFFICE 2,633,284

SEALED COOKING CONTAINER FOR COMESTIBLES

Howard J. Moffett and John C. McFarland, Oakland, Calif.

Application March 28, 1949, Serial No. 83,824

2 Claims. (Cl. 229—2.5)

This invention relates to deformable factory-sealed packages used in the marketing of comestibles and more particularly frozen foods. Before the introduction of the latter for many years can type containers were universally used for the preservation and convenient sale of perishable foods. Where the requirements of the latter did not necessitate the exclusion of the atmosphere, cardboard boxes or bags of paper or cloth ordinarily sufficed. In the latter cases staple foods such as flour, sugar, rice, etc., suffered no deterioration when afforded only protection from the entrance of moisture and foreign matter.

The rapid growth of the frozen food industry in recent years has been accompanied by the introduction of new packaging materials to solve still more effectively the foregoing problem. Unless sealed in a wrapping that is impervious to air and moisture, frozen foods, particularly meats, dehydrate over a period of time and hence are less palatable. Toward the solution of such difficulty new and better wrapping materials of synthetic composition have been developed. These materials are unaffected by moisture within the package or the drying effect of the freezer space without. In addition they possess all the other essential properties of the older type materials. Certain of these materials are transparent and are widely used as a substitute for the familiar cardboard carton for unfrozen foods due to their greater sales appeal. Others, such as aluminum foil have found wide application in uses where more or less free fat constitutes a component of the packaged food as in soup mix, for example.

In all of the foregoing instances the container has served merely as an air tight and moisture tight wrapper for the food whether maintained at room temperature or under frozen conditions. The consumer of such packaged foods has still had the problem of removing the wrapper, placing the contents in a suitable cooking vessel, adding more or less water and cooking for a specified period of time. In the case of frozen vegetables the added water is ordinarily brought to a boil before the contents of the package are deposited therein. However, it is to be noted that excess water should be avoided since it is well known that the flavor and probably the vitamin content also of such vegetable suffer when the added liquid is appreciably greater than the minimum. In view of the critical nature of this factor, it would appear that packers of frozen foods would have by this time adopted the practice long common in the canning industry of including the optimum quantity of liquid along with the vegetable. Admittedly, frozen fruits frequently include a liquid in the form of a syrup probably to give an added and uniform sweetness to the product. In the packaging of frozen meats, to my knowledge, the processors have been satisfied to provide a container that is impervious to both air and moisture. The juices within a steak, for example, and the included marginal or added fat for cooking are preserved intact through many handling operations until ready for final use by the consumer. The latter, however, frequently encounters difficulty in removing the contents from the wrapper regardless of the material of which it is made. Preheating is invariably necessary to separate the solid and liquid contents from the inner surface of the container. After such delay the steak is ready for the cooking step and the addition of the fat and other juices which can usually be salvaged from the mutilated container resulting from a typical opening operation. The present invention is directed toward the elimination of all of the foregoing steps except the single heating step thereby producing more uniformly excellent results and with a material saving of time and trouble.

It is a principal object of this invention, therefore, to provide a container for food, particularly frozen food, which in addition to affording absolute protection during storage and in transit also serves as an individual cooking container or vessel for such food.

Another object of the invention is to provide a container for frozen food which preserves intact the inherent moisture of such food but releases the same as vapor during the cooking operation.

A further object of the invention is to provide a container for frozen food which safeguards the contents thereof and during the cooking operation therein releases excessive water vapor while retaining the essential and less volatile fats.

Another object of the invention is to provide a container for frozen food which is so shaped as to conform to the surface of a flat-bottomed tin or cooking tin to insure maximum transfer of heat to the lower portion of such container and thereby accelerate the cooking operation.

A further object of the invention is to provide a container for frozen food which is so designed as to retain the fatty liquids as well as the food solids throughout the cooking step whereby a cooking pan having only a horizontal supporting surface is entirely adequate due to the fact that the food contents do not contact such pan.

A still further object of the invention is to provide a container of the class described which is economical to fabricate, and may be readily and successfully used by the most inexperienced of cooks.

Other objects and advantages will be apparent from the following description considered together with the drawing in which:

Figure 1 is a median sectional view of a preferred form of my invention,

Figure 2 is a plan view of Figure 1, and

Figure 3 is a sectional view taken on the line 3—3 of Figure 2.

Referring now to the drawing in detail, in which similar reference numerals refer to similar elements throughout the various figures illustrated therein, and in particular to Figure 1, my improved container is seen to be comprised of an upper sheet 1 of preferably rectangular configuration marginally united in any suitable way to a similarly shaped lower sheet 2. Aluminum foil has been found to be a very satisfactory material for the sheets 1 and 2 either with or without a suitable inner lining.

The central rectangular areas 3 and 4 of sheets 1 and 2, respectively, are suitably distended in the forming process to provide an increased inner volume for the container as clearly shown in Figure 1. After the food, such as meat with added fat or gravy, has been placed in the centrally depressed area 4 of the lower sheet 2 the upper sheet 1 is placed thereover and the marginal portions 5, 6, 7 and 8 shown as of appreciable width are sealed together in any desired manner. The latter step may involve the use of any of a number of suitable adhesives known to the art and may also include, if desired, a transverse corrugating of such portions to increase their stiffness.

Disposed between the overlying marginal portions 5, 6, 7, 8 and the corresponding marginal portions therebeneath and preferably midway of such portions is a heat-responsive closure or vent plug 9 extending from the interior of the container to the exterior thereof. Closure 9 may take the form of a cylindrical plug of paraffin wax which will melt and flow outwardly and down the outer surface of the container under the influence of heat and pressure within the container and the surrounding heated air within the oven. As shown particularly in Figure 3, the marginal portions contiguous to the closure 9 are complementarily curved to fit snugly thereabout.

Instead of the heat responsive closure which has been described as the preferred embodiment, various modifications may be utilized. These are best located within the central rectangular area 3 of the upper sheet in order that only water vapor will escape from the container upon heating. Thus, a scored or perforated circular portion coated with paraffin wax and severable from the area 3 upon melting of the wax and the generation of a predetermined heat and pressure within the container. Also, the area 3 could have a disk of material removed therefrom and a larger, covering disk placed thereover and maintained in sealing relation by the use of a suitable adhesive or by paraffine wax as described.

It will be apparent from the foregoing that there has been provided a cooking-type of frozen food container possessing decided advantages over the prior art constructions referred to herein. Both meat and vegetables may be packaged as described and the cooking process materially simplified with the further advantage of optimum palatability and food value. Now for the first time, vegetables may be freezer packed with the precise quantity of water needed in their cooking. When cooking temperature has been reached excess vapor is automatically vented and the residual liquid retained in the lower central area below the marginal portions referred to is sufficient for the completion of the precisely determined cooking period. This feature is particularly important in the cooking of string beans in which release of some of the vaporized liquid adds greatly to the flavor, an observation which may readily be verified by cooking such vegetable in a pressure cooker.

As has been stated the invention is also of great value in cooking meats having added fat or gravy for herein the latter remains within the lower central area or well while only the water vapor escapes. When the latter action occurs the release of internal pressure results in a partial collapse of the container in which the lower central area 4 presents a greater surface contact with the cooking vessel therebeneath and the cooking effect is thus more evenly distributed.

A further practical advantage is in the elimination of the exposure of the food to possible contamination prior to cooking and the obvious applications to hospital use and the preparation of meals on field trips, etc.

We claim:

1. A container particularly for frozen foods comprising a continuous enclosure formed of a generally rectangular sheet upwardly deformed in its central portion and marginally united to a similar but downwardly deformed sheet to provide an enlarged central volume therebetween, said marginal portions being deformed to form an aperture in communication with said central volume and extending between said marginal portions to the exterior of said container adjacent the edge of said portions, and a thermally responsive venting means disposed between the margins of said sheets in said aperture in sealing relation thereto and so arranged as to separate from said margins upon heating to permit the escape of vapor from the interior of said enclosure.

2. A container particularly for frozen foods comprising a continuous enclosure formed of a generally rectangular sheet upwardly deformed in its central portion and marginally united to a similar but downwardly deformed sheet to provide an enlarged central volume therebetween, means on the marginal portions of said sheets defining a generally cylindrical passage extending between said marginal portions from said central volume to the exterior of said container at the margin of said sheets, and a cylindrical plug of paraffin wax disposed in said passage between the margins of said sheets in sealing relation thereto and so arranged as to separate from said margins upon heating to permit the escape of vapor from the interior of said enclosure.

HOWARD J. MOFFETT.
JOHN C. McFARLAND.

REFERENCES CITED

The following references are of record in the file of this patent:

UNITED STATES PATENTS

| Number | Name | Date |
| --- | --- | --- |
| 2,111,041 | Brennan | Mar. 15, 1938 |
| 2,171,588 | McGuffey | Sept. 5, 1939 |
| 2,230,849 | Salfisberg | Feb. 4, 1941 |
| 2,304,591 | Pape | Dec. 8, 1942 |
| 2,361,344 | Yates | Oct. 24, 1944 |
| 2,420,983 | Salfisberg | May 20, 1947 |